US007697960B2

(12) United States Patent
Seo et al.

(10) Patent No.: US 7,697,960 B2
(45) Date of Patent: *Apr. 13, 2010

(54) METHOD FOR DISPLAYING STATUS INFORMATION ON A MOBILE TERMINAL

(75) Inventors: Jeong-Wook Seo, Daegu (KR); Jong-Kerl Lee, Gumi-si (KR); Eun-Jung Seo, Busan (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/111,977

(22) Filed: Apr. 22, 2005

(65) Prior Publication Data

US 2005/0261031 A1 Nov. 24, 2005

(30) Foreign Application Priority Data

Apr. 23, 2004 (KR) ...................... 10-2004-0028407
Oct. 1, 2004 (KR) ...................... 10-2004-0078468

(51) Int. Cl.
*H04B 1/38* (2006.01)
(52) U.S. Cl. ................. 455/566; 455/412.2; 455/414.1; 455/418; 455/419; 455/550.1; 455/556.2; 379/91.17; 379/93.23; 379/167.12; 379/201.04

(58) Field of Classification Search .............. 455/412.2, 455/414.1, 418–420, 466, 550.1, 556.2, 566; 715/705, 706, 709, 715; 379/93.17, 167.12, 379/201.04, 93.23
See application file for complete search history.

(56) References Cited

U.S. PATENT DOCUMENTS

| 5,821,928 | A | * | 10/1998 | Melkus et al. | .............. | 715/809 |
| 5,880,731 | A | * | 3/1999 | Liles et al. | .................. | 715/758 |
| 6,008,810 | A | * | 12/1999 | Bertram et al. | ............. | 715/809 |
| 6,118,451 | A | * | 9/2000 | Alexander | .................. | 715/809 |
| 6,459,440 | B1 | * | 10/2002 | Monnes et al. | .............. | 715/808 |

FOREIGN PATENT DOCUMENTS

WO    WO-02/100121 A2 * 12/2002

* cited by examiner

*Primary Examiner*—Stephen M D'Agosta
(74) *Attorney, Agent, or Firm*—Roylance, Abrams, Berdo & Goodman, L.L.P.

(57) ABSTRACT

A method for displaying status information on a mobile terminal is provided. The method comprises the steps of when an event is generated in the mobile terminal, determining whether a function for displaying a character image has been set for the event; if the function has been set, processing the generated event, selecting a character image corresponding to the event in a character memory and displaying an event processing result together with the selected character image; and if the function has not been set, processing the generated event and displaying the event processing result.

13 Claims, 18 Drawing Sheets

METHOD FOR DISPLAYING STATUS INFORMATION ON A MOBILE TERMINAL

PRIORITY

This application claims priority to two applications entitled "Method for Displaying Status Information on Mobile Terminal," one filed with the Korean Intellectual Property Office on Apr. 23, 2004 and assigned Serial No. 2004-28407 and the other filed with the Korean Intellectual Property Office on Oct. 1, 2004 and assigned Serial No. 2004-78468, the entire contents of which are incorporated herein by reference.

BACKGROUND OF THE INVENTION

1. Field of the Invention

The present invention relates to a method for displaying status information on a mobile terminal. More particularly, the present invention relates to a method and device for displaying status information together with a character image on a mobile terminal.

2. Description of the Related Art

Mobile terminals are becoming more integrated to perform services such as video recording, photography, packet service, instant messaging as opposed to older mobile terminals that only provide simple telephone services. To meet this trend, mobile terminals process and display various events relating to communications, system state alerts, messages, multimedia processing, user settings. The communication related events are call signals that include incoming and outgoing calls. The system state alerting events indicate the status of a mobile terminal, such as low battery status, entry into an area where wireless services are unavailable, or results of a new system setting.

Generally, such events are displayed in a text message format on a display window or indicated through a speaker or a display device. It is possible to inform the user of an event by displaying the event on the display window and at the same time outputting an audible alert through an audio converter of a mobile terminal. As a more effective way to inform the user of an event, an avatar image or animation can also be used.

SUMMARY OF THE INVENTION

Accordingly, the present invention has been made to solve the above-mentioned problems occurring in the prior art, and an object of the present invention is to provide a method for displaying an event processing result together with a character image on a mobile terminal.

Another object of the present invention is to provide a method for displaying an event processing result together with a corresponding character image on a mobile terminal that stores various character images corresponding to different events.

Still another object of the present invention is to provide a method for generating a popup window with a character image on a mobile terminal and displaying an information message in the popup window.

BRIEF DESCRIPTION OF THE DRAWINGS

The above and other objects, features and advantages of the present invention will be more apparent from the following detailed description taken in conjunction with the accompanying drawings, in which.

Throughout the drawings, the same element is designated by the same reference numeral or character.

DETAILED DESCRIPTION OF EXEMPLARY EMBODIMENTS

Hereinafter, embodiments of the present invention will be described with reference to the accompanying drawings. Although specific avatar images are illustrated to explain the present invention, various modifications and additions can be made to the avatar images in order to perform the present invention without departing from the scope of the present invention. Also, in the following description of the present invention, a detailed description of known functions and configurations incorporated herein will be omitted for conciseness.

Figure 1:
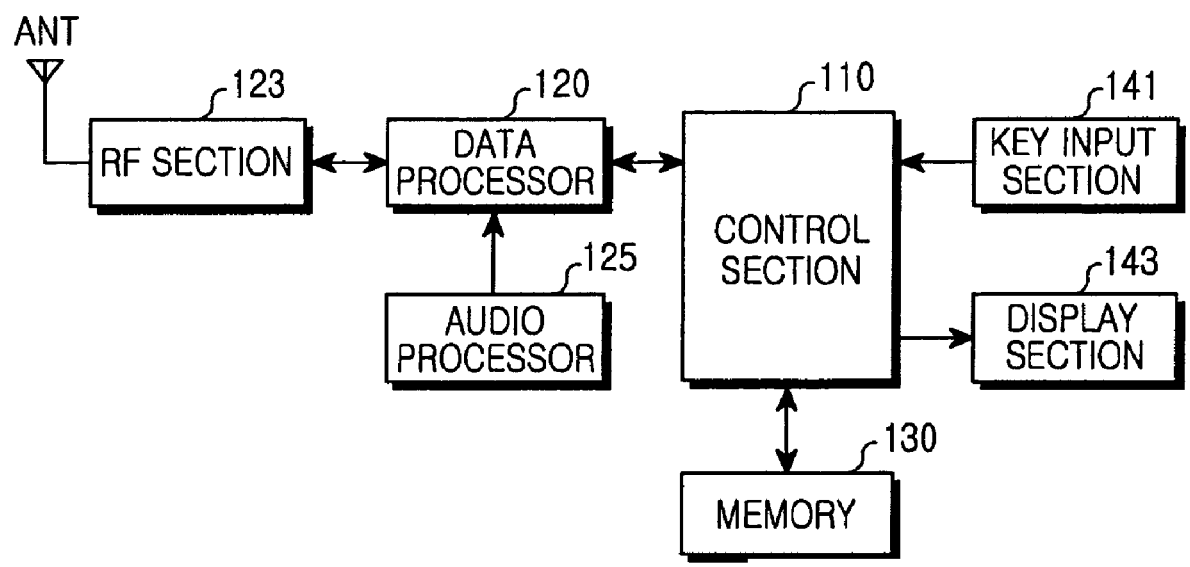
FIG. 1 is a block diagram showing the structure of a mobile terminal capable of displaying an event with an avatar according to an embodiment of the present invention.

FIG. 1 illustrates the structure of a mobile terminal according to the present invention. The mobile terminal can be a general mobile phone.

Referring to FIG. 1, a radio frequency (RF) section 123 performs a wireless communication function for the mobile terminal. The RF section 123 comprises a RF transmitter (not shown) for performing upward conversion and amplification of the frequency of a transmitted signal and an RF receiver (not shown) for amplifying a received signal with low noise and performing a downward conversion of the frequency of the signal. A data processor 120 comprises a transmitter (not shown) for coding and modulating a signal which is being transmitted and a receiver (not shown) for demodulating and decoding a signal which is being received. The data processor 120 may comprise a modem and a codec. An audio processor 125 converts data concerning status information output from a control section 110 into an audio signal.

A key input section 141 is provided with keys for inputting numbers and characters and function keys for setting up various functions.

A memory 130 may comprise a program memory and a data memory. The program memory includes programs for processing call signals and those for controlling facial expressions (or reactions) of an avatar to correspond to the generated events according to an embodiment of the present invention. The data memory temporarily stores data generated during implementation of the above programs. The memory 130 also includes a character memory for storing character images corresponding to various events in accordance with an embodiment of the present invention. The character memory can operate as a file system. Also, each character image can have an index of the memory (or file system). The character memory stores character images classified according to the gestures, facial expressions and items of a character. In the preferred embodiments of the present invention, it is assumed that the character is an avatar. Accordingly, the character will be named "avatar" hereinafter.

The control section 110 controls the overall operations of the mobile terminal. The control section 110 may comprise the data processor 120. If the mobile terminal is a mobile phone, it may have a single mobile station modem (MSM) chip into which the control section 110, data processor 120 and audio processor 125 are integrated. According to an embodiment of the present invention, the control section 110 controls the operations necessary to display any event processing result together with a corresponding avatar image stored in the character memory (hereinafter referred to as the "avatar memory") of the memory 130.

A display section 143 displays the operational state of the mobile terminal under the control of the control section 110. When using a liquid crystal display (LCD), the display section 143 may comprise a LCD controller, a memory for storing image data and a LCD device. When the LCD is a touch screen, it can serve as an input section.

Referring to FIG. 1, the control section 110 controls the operations of the mobile terminal while powered on. Whenever an event that needs be indicated to the user is generated, the control section 110 controls the display section 143 to display the event. The event can be a power on/off state, popup window alert, incoming or outgoing call, receiving or transmission of a text message, alarm setting/cancellation, anniversary alert or the like. The control section 110 processes the generated event and displays the event processing result together with a corresponding avatar image on the display section 143. Each avatar image (or facial expression) can be displayed as an avatar animation or an avatar still picture.

Hereinafter, the mobile terminal's operations associated with an incoming/outgoing call and a text message receipt/transmission will be explained in detail.

When a user (caller) initiates an outgoing call, the control section 110 detects the outgoing call signal and accesses an avatar image corresponding to the outgoing call event in the avatar memory of the memory 130. The control section 110 then displays the corresponding avatar image on the display section 143. When the user dials using the key input section 141, the control section 110 processes dialing information received through the data processor 120, converts the information into an RF signal through the RF section 123 and outputs the RF signal. When detecting a reply signal generated from a recipient through the RF section 123 and the data processor 120, the control section 110 forms a voice communication path comprising the RF section 123 and the data processor 120 so that the user can communicate with the recipient. When an incoming call is received, the control section 110 detects the call through the data processor 120. The control section 110 then accesses an avatar image corresponding to the incoming call in the avatar memory of the memory 130 and displays the avatar image on the display section 143 to inform the user of the incoming call. When the user presses a send button or any other suitable button, the control section 110 forms a voice communication path to enable the user to receive the call.

When the user selects a text message sending menu, the control section 110 generates data input by the user as a text message. When the user subsequently inputs a demand to send, the control section 110 sends the generated text message to an intended recipient through the data processor 120 and the RF section 123. The user may dial the recipient's mobile phone number or input the recipient's email address after inputting the text message. The control section 110 then sends the text message to the dialed phone number or the input email address.

When a text message is received, the control section 110 analyzes the received text message and displays an avatar image corresponding to the message. More specifically, the control section 110 analyzes the received message and detects any words or symbols that may express the feeling or emotion of the message sender. The control section 110 accesses an avatar image corresponding to the analyzed message and displays the received text message together with the corresponding avatar image. The text message may be a Short Message Service (SMS), Multi-Mail Service (MMS), E-mail Message Service (EMS) message or any other message input using characters on a mobile terminal.

To control the display of an avatar image corresponding to a text message, character data that includes emoticons created by a combination of special characters or symbols and words used to express emotions should be pre-registered in the avatar memory of the memory 130. The avatar memory of the memory 130 can operate as a file system. Each avatar image can have an index of the memory (file system). The avatar memory stores avatar images classified according to gestures, facial expressions and items of an avatar.

Hereinafter, the mobile terminal's operations for displaying an avatar image corresponding to each event will be explained in detail.

Figure 2:
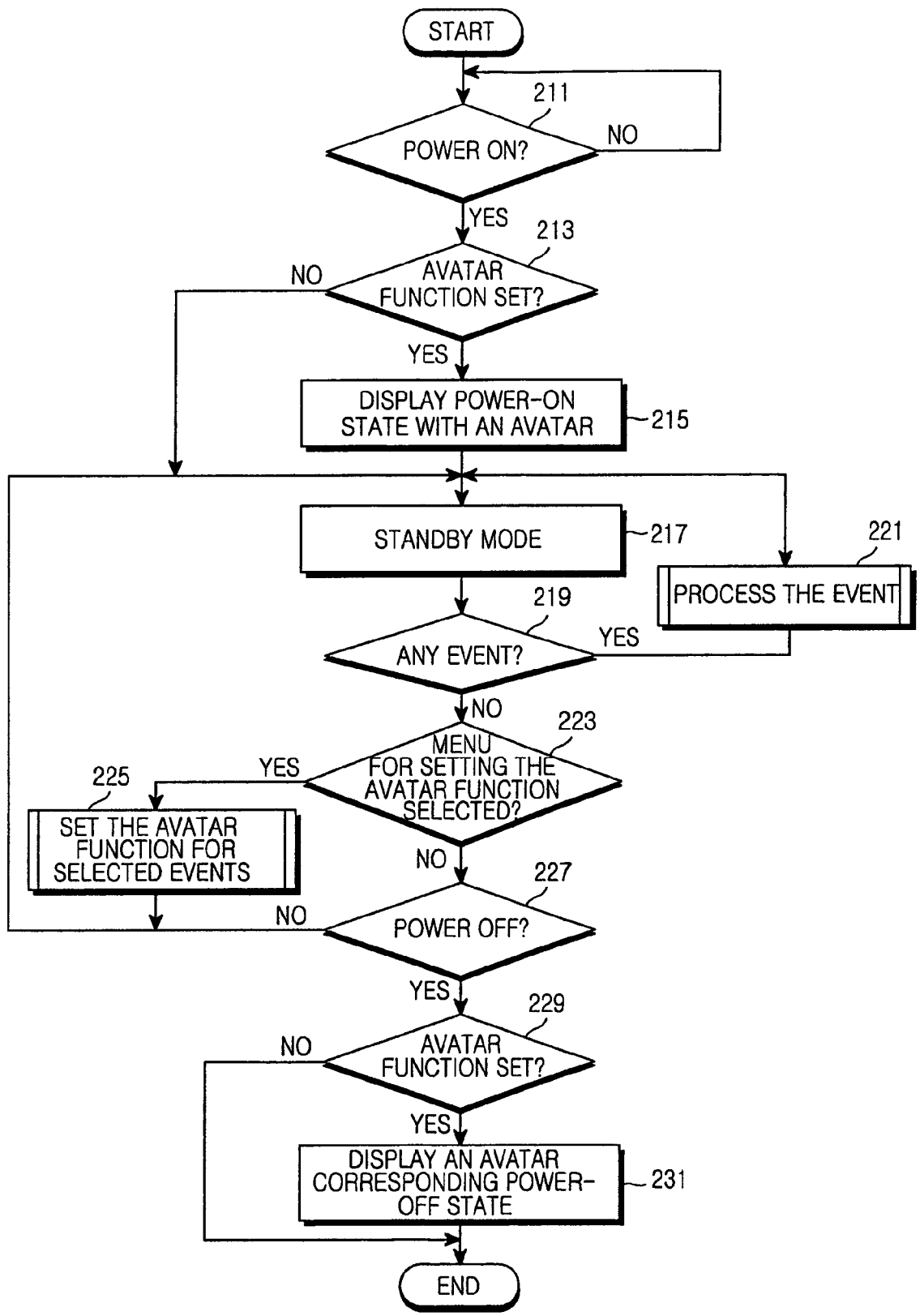
FIG. 2 is a flow chart showing a process of displaying an event together with an avatar on a mobile terminal according to an embodiment of the present invention.

FIG. 2 is a flow chart showing a process of displaying an avatar image to inform the user of an event generated on a mobile terminal according to an embodiment of the present invention. An avatar function according to the present invention is a function to inform the user of an event using an avatar. For the implementation of the avatar function, an avatar image or an avatar animation corresponding to each event is used. Various avatar images and avatar animations are stored in the avatar memory of the memory 130.

Figure 8A:
FIGS. 8A to 8E are images illustrating examples of event processing results with corresponding avatar images according to an embodiment of the present invention.
Figure 8B:
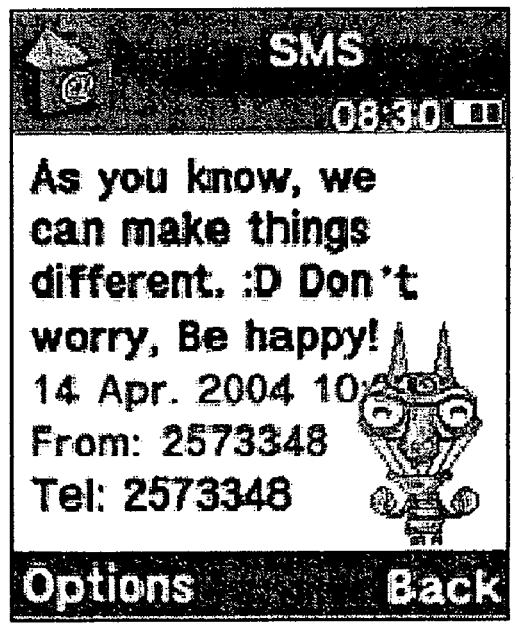
Figure 8C:
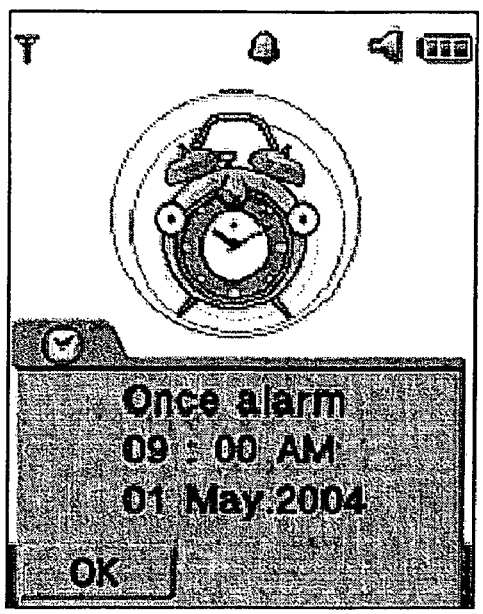
Figure 8D:
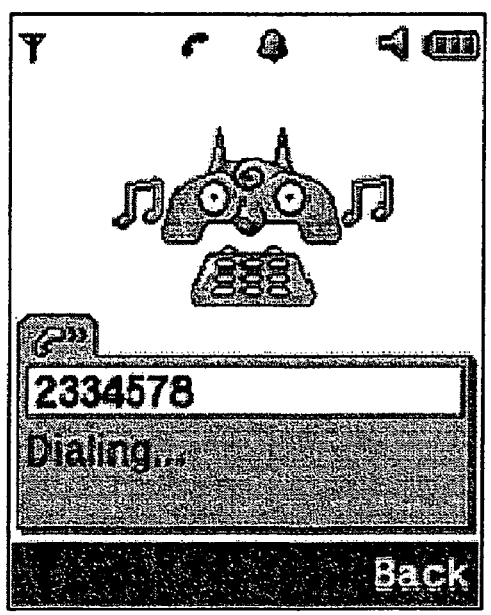
Figure 8E:
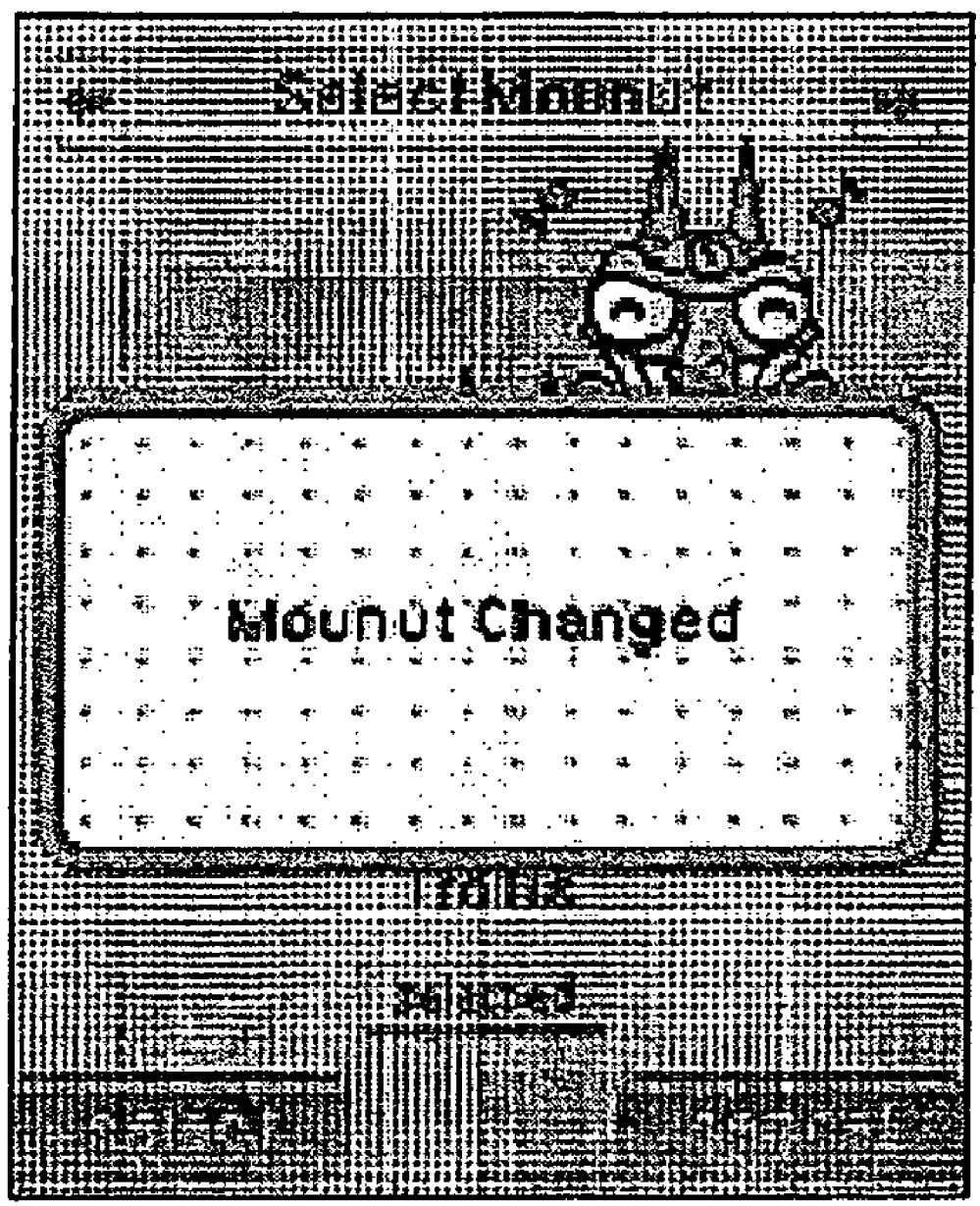

FIGS. 8A to 8E are images illustrating examples of event processing results with corresponding avatar images according to an embodiment of the present invention. Specifically, FIG. 8A shows the display of a power on/off state together with an avatar image. FIG. 8B shows the display of a received text message together with an avatar image. FIG. 8C shows the display of a morning call message (or an alarm clock or schedule alert) together with an avatar image. FIG. 8D shows the display of an incoming/outgoing call event together with an avatar image. FIG. 8E shows the display of a popup window message together with an avatar image.

Figure 9A:
FIGS. 9A to 9E are images illustrating examples of a text message with a corresponding avatar image according to an embodiment of the present invention.
Figure 9B:
Figure 9C:
Figure 9D:
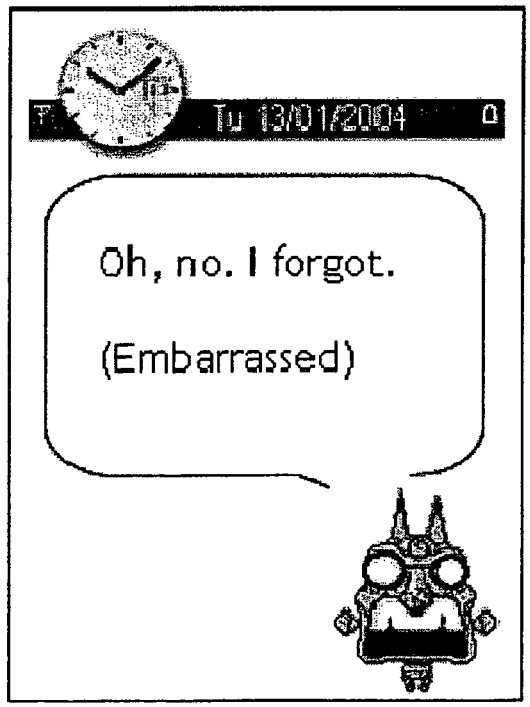
Figure 9E:

FIGS. 9A to 9E are images illustrating examples of a text message with a corresponding avatar image according to an embodiment of the present invention. A text message is analyzed to display an avatar image corresponding to the feeling or emotion expressed in the message. FIG. 9A shows the display of a message expressing a happy emotional state together with an avatar image with a facial expression corresponding to that emotional state. FIG. 9B shows the display of a message expressing a shyness together with a corresponding avatar image. FIG. 9C shows the display of a message expressing a sad emotional state together with a corresponding avatar image. FIG. 9D shows the display of a message expressing an embarrassment together with a corresponding avatar image. FIG. 9E shows the display of a message expressing anger together with a corresponding avatar image.

Figure 10A:
FIGS. 10A to 10C are images illustrating examples of an alarm/schedule alert message with an avatar according to an embodiment of the present invention.
Figure 10B:
Figure 10C:

FIGS. 10A to 10C display an anniversary or schedule alert together with an avatar.

Figure 11A:
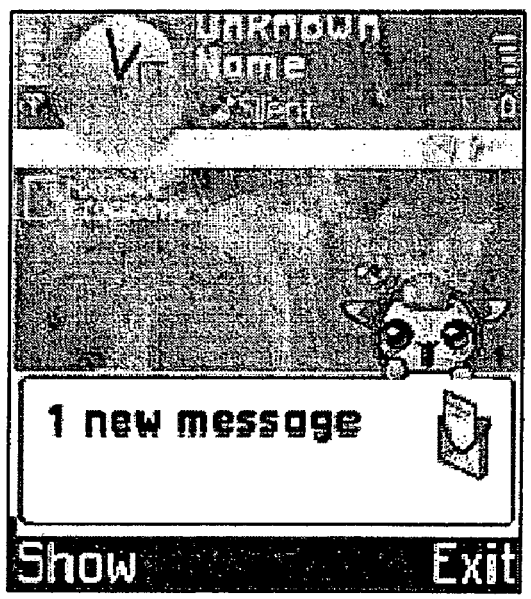
FIGS. 11A to 11C are images illustrating example of an information message in an avatar popup window according to an embodiment of the present invention.
Figure 11B:
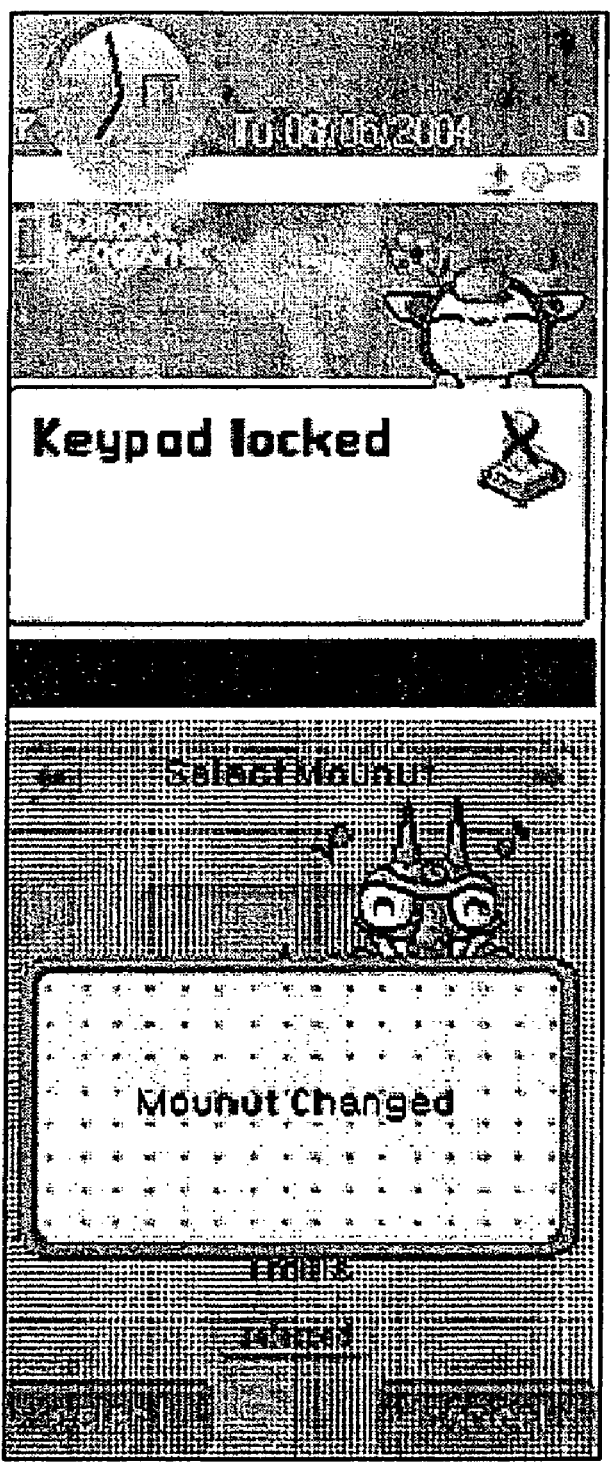
Figure 11C:
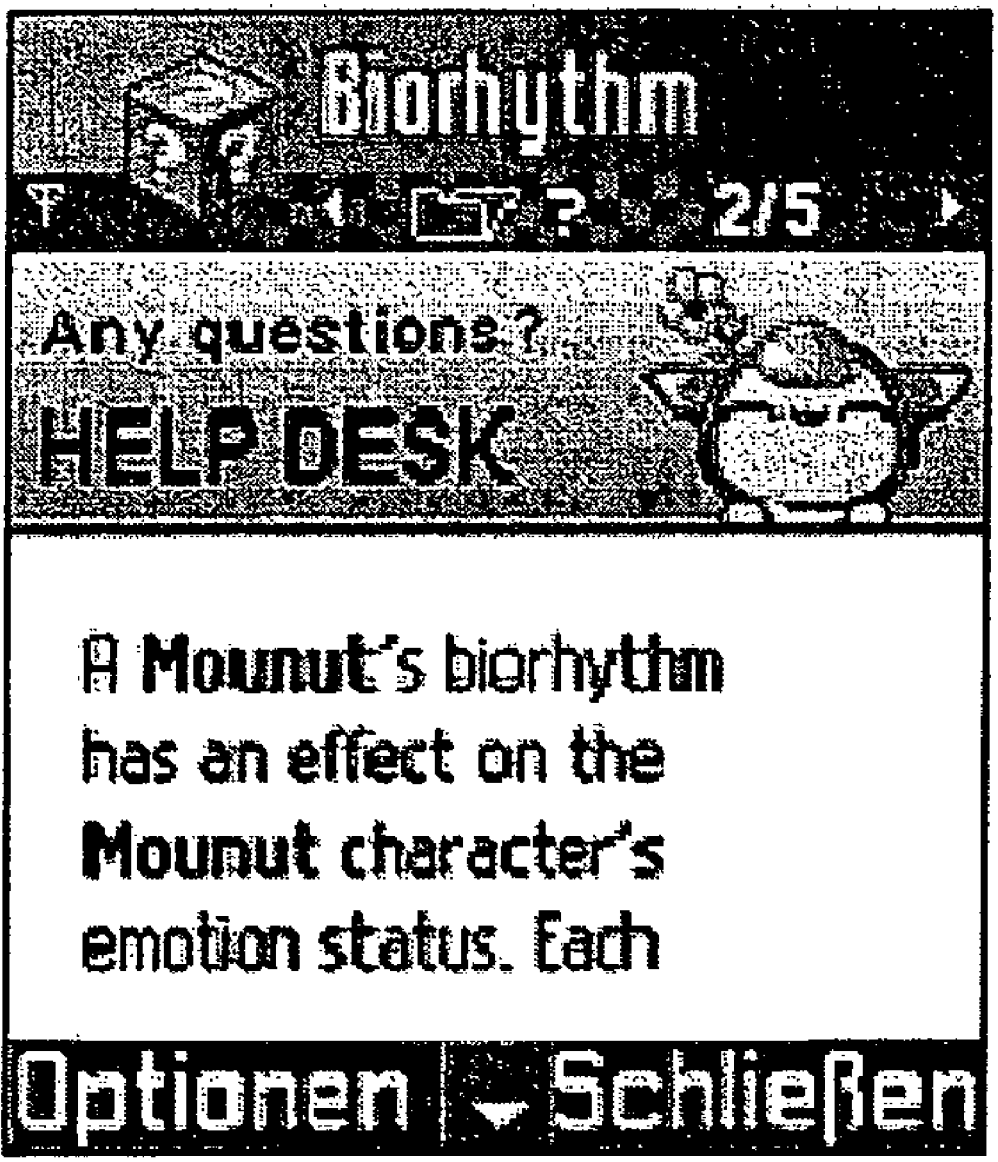

FIGS. 11A to 11C are images illustrating examples of an information message in an avatar popup window.

Referring to FIG. 2, when the user powers on the mobile terminal, the control section 110 detects the power-on state at step 211 and determines whether the avatar function has been set for the power-on state at step 213. The avatar function is a function for displaying an event generated in the mobile terminal together with an avatar. The user can set the avatar function by selecting a corresponding menu on the mobile terminal. If the avatar function is set for specific events, each specified event or status information will be displayed together with an avatar. Otherwise, each event or status information will be displayed without any avatar image.

When detecting the setting of the avatar function at step 213, the control section 110 proceeds with step 215 to access an avatar image corresponding to the power-on state in the avatar memory of the memory 130 and display the power-on state information together with the corresponding avatar image on the display section 143.

Then the control section 110 enters a standby mode at step 217. The standby mode refers to a mode in which the mobile terminal implements no event or function. When a new event is generated in the standby mode, the control section 110 detects the event at step 219 and processes the event at step 221. If the avatar function has been pre-set to inform the user of the event, the control section 110 will display the event processing result together with an avatar on the display section 143. If the avatar function has not been set for the event, the control section 110 will process the event and will display only the event processing result without any avatar image. The event can be an incoming or outgoing call, text message receiving or transmission, user's confirmation of any incoming call while absent or any received text message, a preset alarm or a system state alert that automatically informs the user of the present status of the mobile terminal. When any event that should be indicated to the user is generated in the standby mode, the control section 110 detects the event and displays information relating to the event and a corresponding avatar image on the display section 143 at step 221.

If the user presses an end button to power off the mobile terminal during the display of the event and the avatar image, the control section 110 will detect the button pressing at step 227 and will proceed with step 229 to confirm whether the avatar function has been set to inform the user of the power-off state. If the avatar function has been set for the power-off state, the control section 110 will proceed with step 231 to access an avatar image as shown in FIG. 8A. The control section 110 will display the avatar image as shown in FIG. 8A on the display section 143 and will then power off the mobile terminal.

Figure 3:
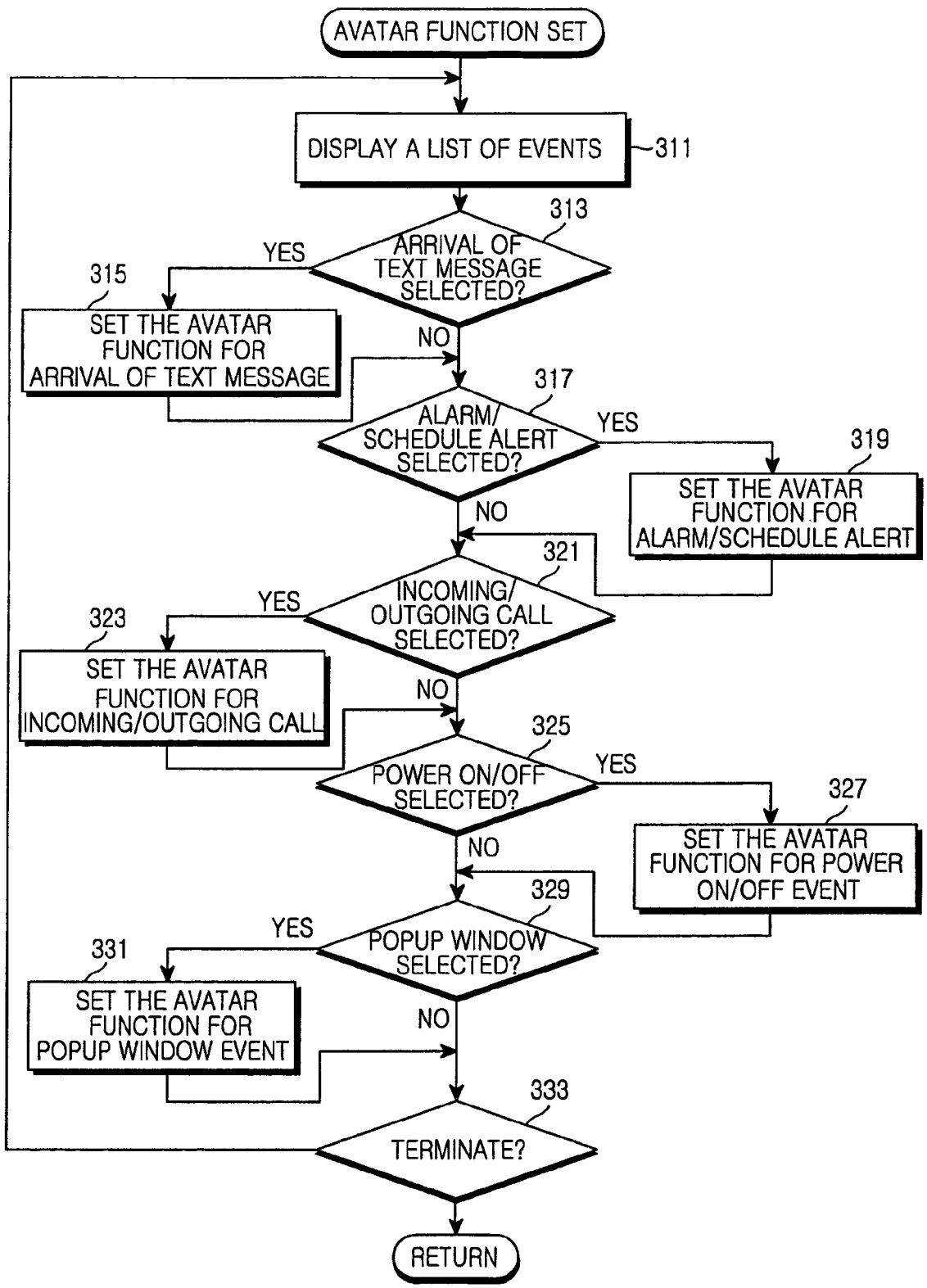
FIG. 3 is a flow chart showing operations of setting an avatar function in the process of FIG. 2 according to an embodiment of the present invention.
Figure 12A:
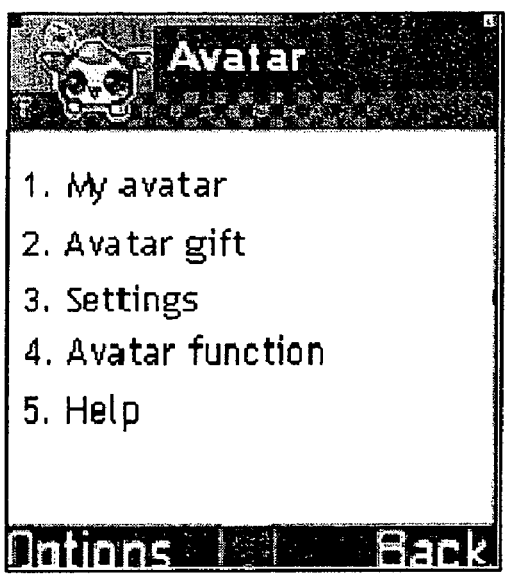
FIGS. 12A and 12B are images illustrating menus selectable to set an avatar function in a mobile terminal according to an embodiment of the present invention.
Figure 12B:
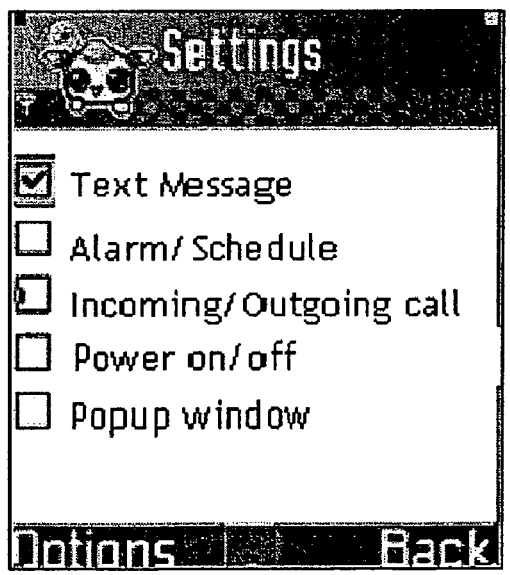

If the user selects a menu for setting the avatar function in the standby mode, the control section 110 will detect the selection at step 223 and will proceed with step 225 to set the avatar function for the events selected by the user. FIG. 3 is a flow chart showing how to set the avatar function for certain events in the mobile terminal (step 225). FIGS. 12A and 12B show the menus selectable to set the avatar function for certain events in the mobile terminal.

Referring to FIG. 3, when the user selects a menu for setting the avatar function (see FIG. 12A), the control section 110 detects the selection at step 311 and displays a list of events for which the avatar function can be set (see FIG. 12B). It is assumed that such events include an arrival of a text message, alarm/schedule alert, incoming or outgoing call, power-on/off and popup window. The user can select the events in a group or individually in the displayed list as shown in FIG. 12b. If the listed events are selected in a group, the control section 110 will perform steps 313 to 331, applying the avatar function to all events generated. If some of the listed events are individually selected, the control section 110 will apply the avatar function only to the selected events.

If the user selects "arrival of a text message" among the listed events to set the avatar function, the control section 110 will detect the selection at step 313 and will proceed with step 315 to set a text message arrival indicating function and an avatar text message function. Upon setting of the two functions, arrival of a text message can be informed with the display of an avatar and the arrived text message can be displayed together with an avatar image corresponding to the emotion expressed in the text message.

If the user selects "alarm/schedule alert" among the listed events, the control section 110 will detect the selection at step 317 and will proceed with step 319 to set the avatar function for the selected event. The alarm/schedule alert includes an alarm, morning call and schedule/anniversary alert. Alarm is a function to ring an audible alarm at least once at a preset time. To implement the alarm function, a desired alarm time, alarm ring intervals and a bell sound or melody should be previously set. Morning call is a function to ring at a preset time every morning or in the morning of weekdays. Morning call works at the preset time even if the mobile terminal is in a vibration or silent mode. To implement the morning call function, a desired ringing time, ringing intervals and a bell sound or melody should be preset. Schedule alert is a function to remind the user of a previously registered schedule by generating an alarm at the date and time specified. For the schedule alert, a date/time, a scheduled appointment or task and a bell sound or melody should be pre-registered.

Anniversary alert is a function to display an avatar and a short text message to inform the user of an anniversary previously registered in the mobile terminal. Some anniversaries such as international and national holidays are generally registered during the manufacture of mobile terminals. Personal anniversaries can be registered using the "schedule" menu. Anniversaries may include international holidays or anniversaries (for example, New Year's Day, May Day and Christmas Day), national holidays or anniversaries (for example, Independence Movement Anniversary, Constitution Day, Independence Day and Foundation Day of Korea) and personal anniversaries (wedding anniversary and birthdays of family members). Such anniversaries can be registered in the "schedule" menu. The mobile terminal stores various avatar images and short text messages corresponding to the respective anniversaries in the memory 130. The user can select a desired avatar image and short message to register a specific anniversary. Alternatively, the user can select a desired avatar image among the stored images and then directly inputs a text message corresponding to the anniversary.

If the user selects "incoming/outgoing call" among the listed events, the control section 110 will detect the selection at step 321 and will proceed with step 323 to set the avatar function for any incoming or outgoing call. Thus, when the user receives or makes a call, the incoming or outgoing call information will be displayed together with an avatar on the display section 143.

If the user selects "power on/off" among the listed events, the control section 110 will detect the selection at step 325 and will proceed with step 327 to set the avatar function for the power on/off event. When the mobile terminal is powered on or off, the on or off process will be displayed together with an avatar.

If the user selects "popup window" among the listed events, the control section 110 will detect the selection at step 329 and will proceed with step 331 to set the avatar function for any popup window information and then terminates at step 333. When the user selects a menu for system state alert or a help, a popup window with an avatar is displayed on the display section 143. The system state information or the help explanations are displayed as text within the popup window.

The system state information includes a low battery state, deviation from service available areas, setting or cancellation of a function in the mobile terminal. The help provides explanations of an avatar system, avatar system on/off, avatar text message, avatar changes, avatar emotions, avatar house setting, avatar house decorations, specific function setting, sending an avatar through IrDA, and so on. A list of help explanations is displayed under the help menu. If a specific help explanation is selected, the control section 110 will display the selected help explanation in the avatar added popup window.

As explained above, the user can set the avatar function during the use of the mobile terminal. The avatar function can be set for the events selected in a group or individually by the user.

Figure 4:
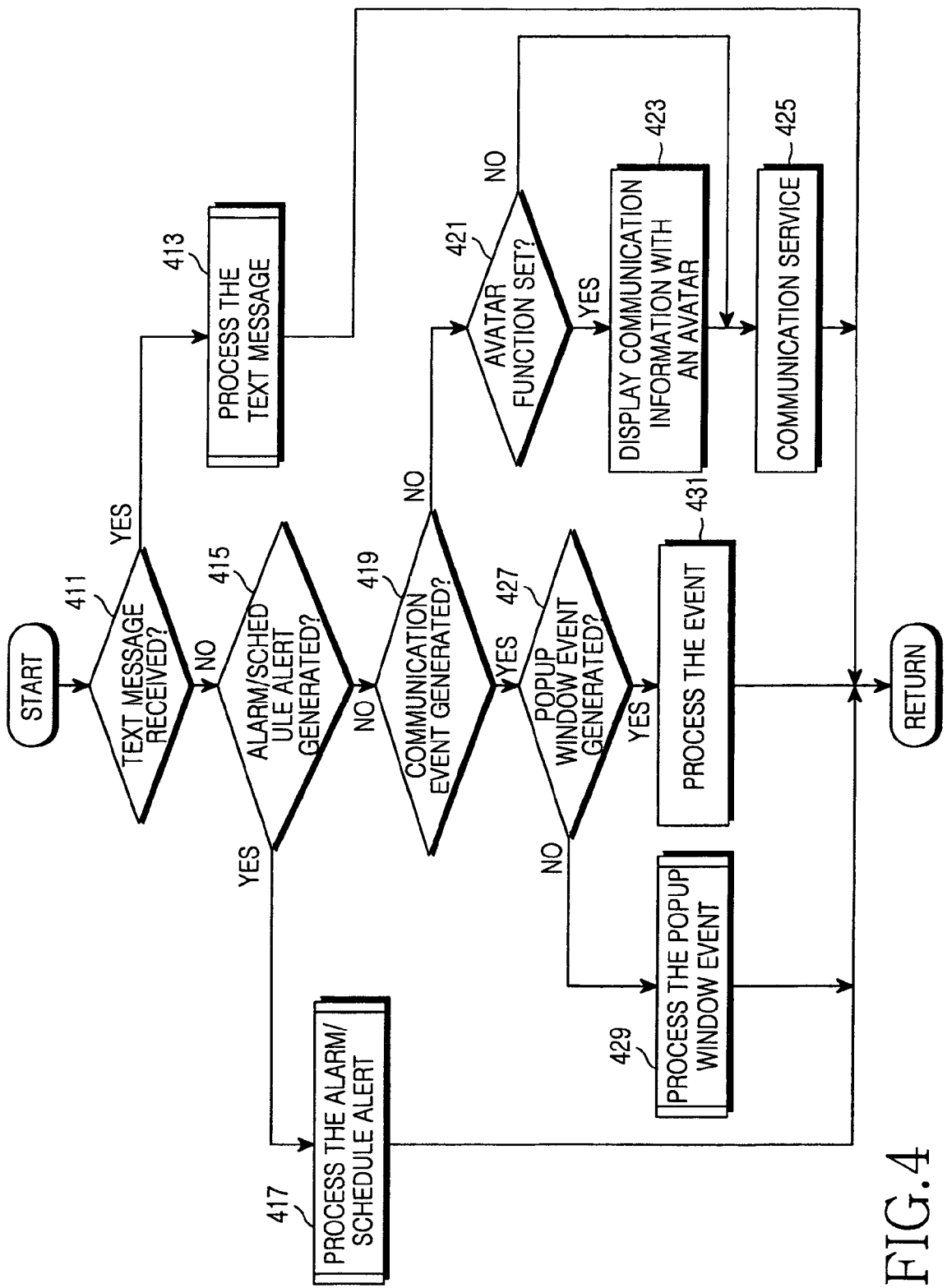
FIG. 4 is a flow chart showing operations of processing an event generated in the process of FIG. 2 to be displayed together with an avatar image according to an embodiment of the present invention.

When an event for which the avatar function has been set is generated, the control section 110 detects the event at step 219 and proceeds with step 221 to process the event as shown in FIG. 2. FIG. 4 is a flow chart showing how to process an event generated in a mobile terminal according to the present invention. It is assumed that the avatar function has been set for the arrival of a text message, alarm/schedule alert, incoming or outgoing call, power-on/off and popup window. The avatar function can be set for any other events such as incoming calls while absent.

Referring to FIG. 4, when a text message arrives, the control section 110 detects the arrival of the text message at step 411 and processes the text message at step 413. At the same time, the control section 110 analyzes the text message to detect any emotional expressions (i.e., words or symbols expressing an emotional state). According to the results of the analysis, the control section 110 displays the text message together with a corresponding avatar image. As stated above, the text message can be a Short Message Service (SMS), Multi-Mail Service (MMS), E-mail Message Service (EMS) message or any other message input using characters on a mobile terminal.

Emotional expressions, which are keys to display a suitable avatar image, can be emoticons created by a combination of special characters or symbols and words used to express emotions. Avatar images representing various emotional states are pre-stored in the avatar memory of the memory 130. The emotional expressions (i.e., emoticons and words) are also pre-registered in an emotional expression memory of the memory 130 as shown in Table 1. The avatar memory and the emotional expression memory can operate as a file system. Each avatar image can have an index of the memory (file system). The avatar memory stores avatar images classified according to gestures, facial expressions and items of an avatar. Examples of the emotional words and emoticons that can be included in a text message and can be registered in the memory are listed in Table 1.

TABLE 1

| Emotion | Emoticons | Words | Avatar Image |
| --- | --- | --- | --- |
| Happiness | ^ ^ ^ ^ ^ ^ * ^ <br> ^ o ^ 6 ^ | Love, happy, excited, Oo-hoo | FIG. 9A |
| Shyness | ; ^ ^ * * ^ ^ * * ^ . ^ * <br> * ^ ^ * * ^_^ * ** ^ ^ ** | Ashamed, shy, discouraged | FIG. 9B |
| Anger | — - -_- ^ <br> —l(;,) | Nervous, annoyed, angry, bothering | FIG. 9C |
| Embarrassment | -_-; -λ- =__= <br> =λ= | Embarrassed, upset, bummed, surprise | FIG. 9D |
| Sadness | TT T_T T-T T.T <br> ┰┰ ┰_┰ ┰_┰ ┰┰_┰┰ | Sad, unhappy, crying, weep | FIG. 9E |

Emotional expressions generally used in text messages can be classified into multiple groups as shown in Table 1. Five basic human emotions may be happiness, anger, sorrow, shyness and embarrassment. In the preferred embodiments of the present invention, it is assumed that emotions generally expressed in text messages are happiness, shyness, anger, embarrassment and sadness as indicated in Table 1. FIGS. 9A to 9E show examples of avatar images corresponding to the emoticons or words in Table 1 that represent various emotions. The avatar images are all stored in the avatar memory of the memory 130. In addition, each of the avatar images illustrated in FIGS. 9A to 9E can be displayed as a single still picture or an animation created by a combination of multiple avatar images. As a basis of selecting a suitable avatar image, the emoticons and words listed in Table 1 are stored in the emotional expression memory of the memory 130. If necessary, the user can store additional emoticons and words that express emotions or delete any of the stored emoticons or words.

Figure 5:
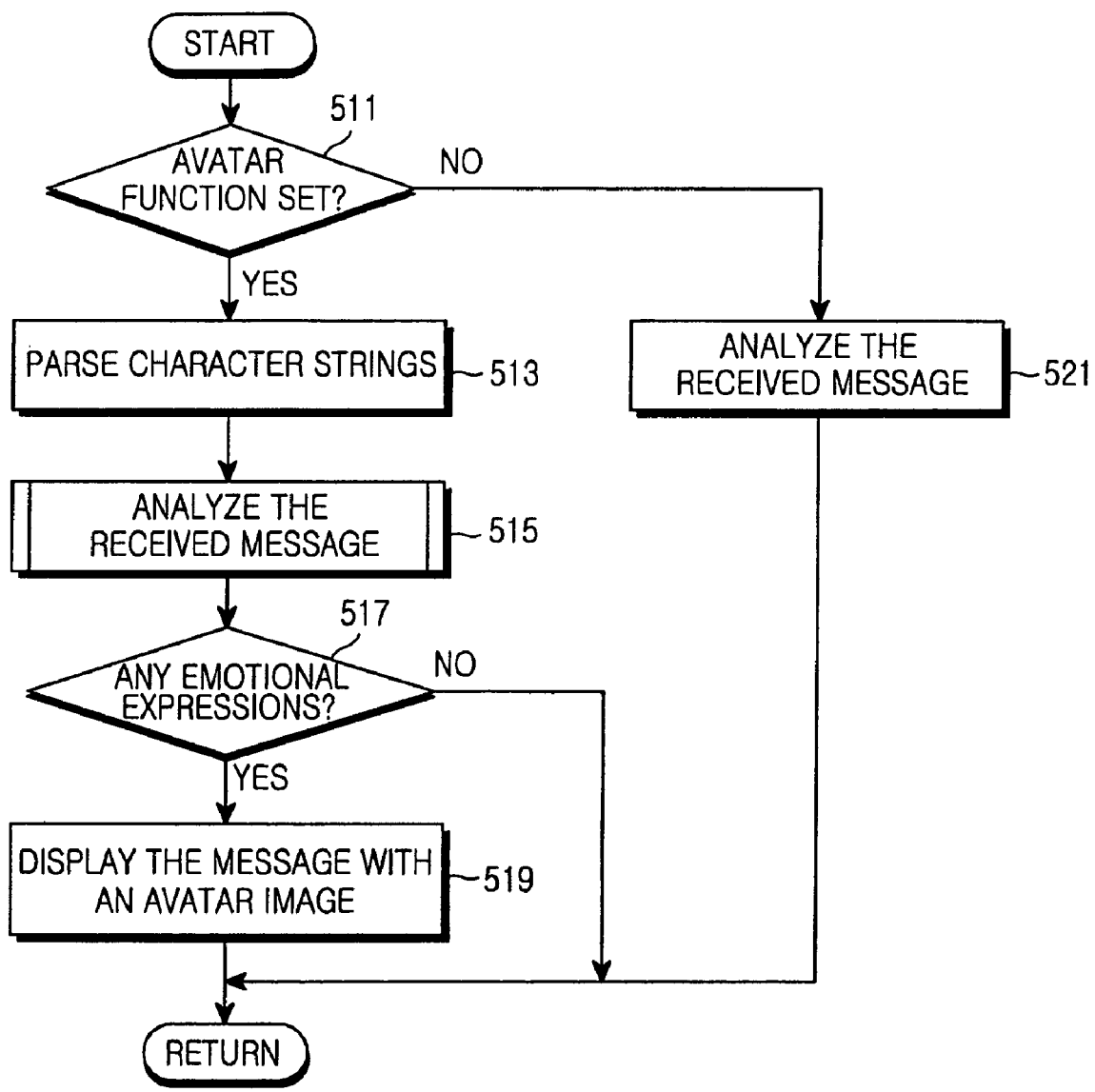
FIG. 5 is a flow chart showing operations of analyzing a text message received in the process of FIG. 4 and displaying the message together with an avatar image according to an embodiment of the present invention.

Hereinafter, a process of displaying an avatar image according to emotional expressions included in a received text message will be explained in detail. FIG. 5 is a flow chart showing the operations of analyzing emotional expressions in a text message received at step 413 and displaying the message with an avatar image corresponding to the emotional expressions.

Referring to FIG. 5, when a text message is received, the control section 110 determines whether the avatar function has been set at step 511. If the avatar function has not been set, the control section 110 will display the received text message on the display section 143 at step 521 without any avatar image.

If the avatar function has been previously set, the control section 110 will detect the setting of the avatar function at step 511 and will proceed with step 513 to parse character strings in the text message and analyze the text message data to detect any emotional expression. The control section 110 first analyzes the text data format in the parsed character strings. The text data format can be a format of general characters, avatar display characters or emoticons. The avatar display characters and emoticons are emotional expressions stored in the avatar memory of the memory 130 and convey emotions as shown in Table 1. The control section 110 parses the character strings and compares the parsed characters with the emoticons and words listed in Table 1 to determine whether any emotional expression is included. If the control section 110 determines that the text message includes no emotional expression as listed in Table 1, it will display the text message as general text on the display section 143.

If the control section 110 determines that an emotional expression is included in the text message, it will determine the corresponding emotion which can be happiness, shyness, anger, embarrassment or sadness as shown in Table 1 according to an embodiment of the present invention. If necessary, further emotions can be added to classify emotional expressions into a larger number of groups.

Various methods can be used to determine the main emotion expressed in a text message. A first method is to determine the main emotion based on the first emotional word or emoticon in the text message. A second method is to determine the main emotion based on the last emotional word or emoticon in the text message. A third method is to determine the emotion most frequently expressed using emotional words or emoticons in the text message. A fourth method is to determine the main emotion based on the emoticon included in the text message. The fourth method is available when only one emoticon is included in the text message. A fifth method is to determine the main emotion by analyzing all emotional words and emoticons included in the text message. A sixth method is to analyze the emotional expressions included in the text message, prioritize the expressions according to their intensity levels and determine the main emotion based on the highest intensity level expression.

Any of the above methods can be used to determine the main emotion expressed in the text message. After analyzing the text message at step 515, the control section 110 detects whether any emotional expression is included in the text message at step 517. If any emotional expression is detected, the control section 110 will proceed with step 519 to determine the main emotion expressed in the text message using one of the above six methods. Then the control section 110 will access an avatar image corresponding to the main emotion in the avatar memory of the memory 130. The avatar image can be any of those illustrated in FIGS. 9A to 9E. The control section 110 displays the text message together with the corresponding avatar image on the display section 143.

Figure 6:
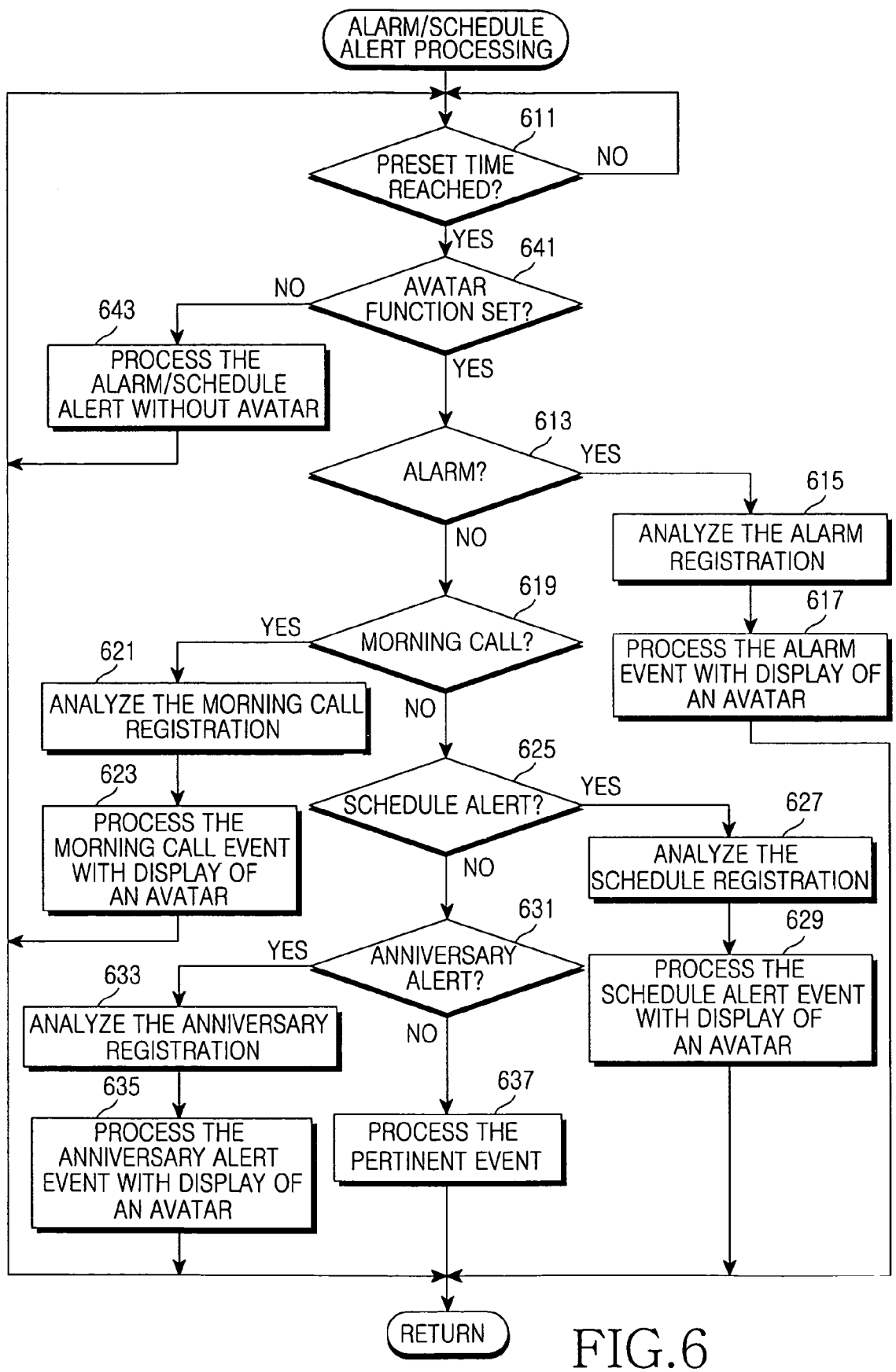
FIG. 6 is a flow chart showing operations of analyzing an alarm/schedule alert generated in the process of FIG. 4 and displaying an alarm/alert message together with an avatar according to an embodiment of the present invention.

When an alarm or schedule alert is generated, the control section 110 detects the alarm or schedule alert event at step 415 and processes the event at step 417. FIG. 6 is a flow chart showing the operations performed to process the alarm or schedule alert event (step 417 in FIG. 4).

Referring to FIG. 6, when the control section 110 detects that a preset alarm or schedule alert time is reached at step 611, it analyzes the preset alarm or schedule alert and generates an alarm sound. The alarm/schedule alert includes an alarm, morning call and schedule or anniversary alert. Generally, alarm and morning calls are set to ring periodically at a preset time everyday or every weekday. Schedule or anniversary alerts are set to alert only at a specified time of a specified date. The process of registering an alarm or schedule alert has been explained with reference to FIG. 3. Anniversaries such as national or international holidays are generally registered during the manufacture of mobile terminals. Personal anniversaries can be registered using the schedule menu.

When detecting that a preset alarm time is reached at step 611, the control section 110 checks alarm/schedule alert registrations. If an alarm has been set to be generated at the time, the control section 110 will detect the alarm setting at step 613 and will proceed with step 615 to analyze the alarm registration and then to output a corresponding avatar and a preset bell sound or melody at step 617. The display of an alarm message with an avatar is illustrated in FIG. 8C. If a morning call has been set to ring at the time, the control section 110 will detect the morning call setting at step 619 and will proceed with step 621 to obtain information about the preset bell sound or melody for the morning call registration and determine a suitable avatar image. The control section 110 will then proceed with step 623 to output the avatar image and the preset bell sound or melody to process the morning call event. The display of a morning call message with an avatar image is illustrated in FIG. 8C. If a schedule alert has been set to be generated at the time, the control section 110 will detect the schedule alert setting at step 625 and will proceed with step 627 to obtain information about the registered text data and preset bell sound or melody for the schedule alert and determine a suitable avatar image. The control section 110 will then proceed with step 629 to output the avatar image, text data and bell sound or melody to process the schedule alert event. At this time, the text data for the schedule alert may include the appointment date, time, place and purpose. If an anniversary alert has not been set to be generated at the time at step 631, the control section 110 will process the pertinent event at step 637. If an anniversary alert has been set to be generated at the time, the control section 110 will detect the anniversary alert setting at step 631 and will proceed with step 633 to obtain information about text data registered for the schedule alert and determine a suitable avatar image. The control section 110 will then display the avatar image and the text data at step 635 to process the anniversary alert event. Anniversary alerts that can be displayed on the display section 143 are illustrated in FIGS. 10A to 10C. FIG. 10C shows the display of an example text message and avatar image for New Year's Day. FIG. 10B shows the display of an example text message and avatar image for May Day. FIG. 10A shows the display of an example text message and avatar image for Christmas Day.

If the control section 110 detects that the avatar function is not set for such alarm/schedule alerts at step 641, it will process the alarm/schedule alert events in a conventional manner at step 643. In other words, the control section 110 will display the alarm/schedule alerts without any avatar image.

When a preset alarm/schedule alert time is reached, the control section 110 detects a pertinent alarm/schedule alert that has been registered to be generated at the time. The control section 110 accesses an avatar image (still picture or animation) suitable for the detected alarm/schedule alert in the avatar memory of the memory 130. Then the control section 110 displays an alarm/schedule alerting message together with the suitable avatar image on the display section 143.

When a communication event (incoming or outgoing call) is generated, the control section 110 detects the event at step 419 (FIG. 4) and proceeds with step 421 to determine whether the avatar function has been set for the communication event. If the avatar function has not been set, the control section 110 will proceed with step 425 to perform a communication function in a conventional manner. If the avatar function has been set, the control section 110 will detect the setting at step 421 and will proceed with step 423 to display communication information (for example, telephone number) together with an avatar as shown in FIG. 8D. Subsequently, the control section 110 will process the communication event at step 425.

Specifically, when a communication event is generated, the control section 110 detects the event at step 419. If the avatar function has been set for the communication event, the control section will proceed with step 423 to access an avatar image (or avatar animation) corresponding to the communication event in the avatar memory of the memory 130 and display the communication information together with the avatar image on the display section 143. If the communication event is an incoming call, the control section 110 will output a bell sound through the speaker. When the user opens the folder of the mobile terminal, the control section 110 will then display the incoming call information together with an avatar image corresponding to the incoming call on the display section 143. In other words, the control section 110 will access an avatar image (or avatar animation) as shown in FIG. 8D in the avatar memory of the memory 130 and will then display the incoming call information together with the accessed avatar image on the display section 143.

Figure 7:
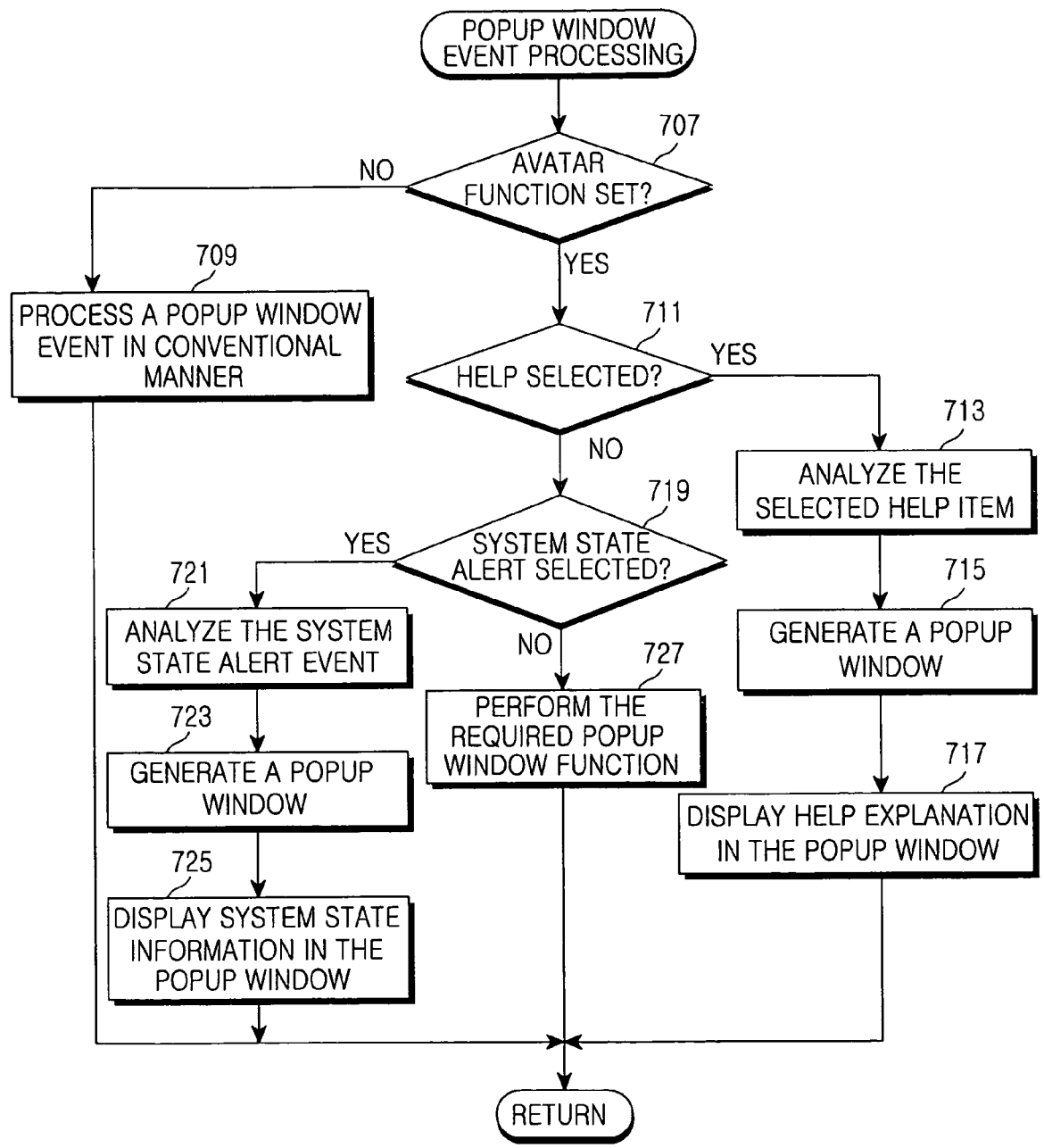
FIG. 7 is a flow chart showing operations of displaying an event generated in the process of FIG. 4 in an avatar popup window according to an embodiment of the present invention.

When a popup window event is not generated, the control section 110 detects the event at step 427 (FIG. 4) and processes the popup window event at step 429. When a popup window event is generated, the control section 110 detects the event at step 427 and processes event at step 431. In the preferred embodiments of the present invention, it is assumed that the popup window event is a system state alert or a help menu in a popup window. The system state alert is generated by the mobile terminal to inform the user of its own system state or results of an implemented function. The system state alert may indicate a low battery state or deviation from service available areas. The help menu provides explanations of the functions available on the mobile terminal. When the user selects a specific system function under the help menu, an explanation of the selected function will be provided. If the avatar function has been set for the popup window event, any system state alert will be displayed in an avatar added popup window. FIG. 7 shows the operations of processing a popup window event according to the present invention.

Referring to FIG. 7, when a popup window event is generated, the control section 110 confirms whether the avatar function has been set for the popup window event at step 707. If the avatar function has not been set, the control section 110 will proceed with step 709 to process the popup window event in a conventional manner. If the avatar function has been set, the control section 110 will detect the setting at step 707 and will process the event accordingly. If the generated event is the user's selection of a help explanation, the control section 110 will detect the selection at step 711 and will analyze the selected help explanation at step 713. After generating a popup window having an avatar at step 715, the control section 110 will display the selected help explanation data in the avatar popup window at step 717. The help menu comprises explanations of an avatar system, avatar system on/off, avatar text message, avatar changes, avatar emotions, avatar house setting, avatar house decorations, avatar gifts, and so on. FIG. 11C shows a help explanation of the avatar system displayed in an avatar popup window.

If the generated popup window event is a system state alert at step 719, the control section 110 will analyze the system state alert event at step 721 and will generate a popup window for displaying system state information at step 723. The popup window includes an avatar. The control section 110 will then proceed with step 725 to display the system state information within the avatar popup window. The system state information may be the current state of the mobile terminal (for example, low battery, service unavailable or arrival of a text message) or the results of implementation of a specific function (for example, program or data download, data registration in a phonebook or selection of an avatar in the avatar system). If the generated popup window event is not a system state alert at step 719, the control section 110 proceeds with step 727 where the required popup window function is performed. FIG. 11A shows the display of the results of confirmation of any new text message received ("no new message received") in a popup window. FIG. 11B shows the display of the results of a new avatar selection in a popup window. The avatar displayed together with a popup window can be either a positive image or a negative image according to the results displayed in the popup window. In other words, when the system state information provides negative results, an avatar image with a negative facial expression is displayed on the popup window as shown in FIG. 11A. On the other hand, when the system state information is positive, an avatar image with a positive facial expression is displayed on the popup window as shown in FIG. 11B.

The system state alerting event includes confirmation of any incoming call received while absent (or while out of service area). The event also includes confirmation of any text message received. When the user selects a menu for confirming any incoming call received while absent, the control section 110 detects the incoming call confirming event and confirms the number of incoming calls received while absent through the memory 130. Then the control section 110 accesses an avatar image (or avatar animation) corresponding to the incoming call confirming event in the avatar memory of the memory 130 and displays status information including the number of incoming calls received while absent, together with the avatar image, on the display section 143. In summary, when the user requests confirmation of any incoming call received while absent, the control section 110 confirms the number of incoming calls received while the user was absent, accesses a corresponding avatar image in the avatar memory and display the number of incoming calls received while the user was absent, together with the avatar image, on the display section 143.

When any event other than those explained above is generated, the control section 110 detects the event and accesses an avatar image (or avatar animation) corresponding to the event. The control section 110 then displays status information relating to the event together with the corresponding avatar image on the display section 143. If the detected event cannot be displayed with an avatar image, the control section 110 will only display status information relating to the event without any avatar image.

As explained above, when an event that needs be indicated to the user is generated in a mobile terminal, status information relating to the event can be displayed together with a corresponding avatar image or avatar animation stored in the avatar memory. Although some basic events or functions of a mobile terminal have been explained to be displayable with an avatar, multimedia functions implemented in the mobile terminal can also be the subject of the avatar image or animation display. When a mobile terminal equipped with a built-in camera performs a camera mode, reproduction mode, transmission mode or storage mode, it can display such a mode together with a corresponding avatar image or animation. When a mobile terminal having a satellite broadcast receiver performs a channel selection mode, reproduction mode or recording mode, it can display each mode together with a corresponding avatar image or animation.

In addition, when a mobile terminal having a multimedia function stores or transmits multimedia data, it can display the storage or transmission mode, overlaying an avatar image or animation on the display.

According to embodiments of the present invention, a mobile terminal has an avatar memory that stores various avatar images or animation data corresponding to different events (functions or services) When an event is generated in the mobile terminal, an avatar image or avatar animation corresponding to the event is accessed and displayed together with status information relating to the event. It is possible to visually and effectively inform the user of any generated events using various avatar images.

Although certain embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for displaying status information on a mobile terminal, comprising the steps of:
   when an event is generated in the mobile terminal, determining whether a function for displaying a character image has been set for the event;
   if the function has been set, processing the generated event, selecting a character image corresponding to the event in a character memory and displaying an event processing result together with the selected character image; and
   if the function has not been set, processing the generated event and displaying the event processing result;
   wherein said character image is an avatar and said character memory is an avatar memory for storing avatar images corresponding to different events;
   wherein said step of displaying the event processing result comprises:
      when the generated event is an alarm/schedule alert event for which the character displaying function has been set and when a preset alarm/schedule alert time is reached, analyzing a list of alarm/schedule alert registrations; and
      detecting an alarm/schedule alert to be generated at the preset time, selecting an avatar image corresponding to the alarm/schedule alert in the avatar memory and displaying an alarm/schedule alert message together with the selected avatar image;
   wherein said display of the alarm/schedule alert message comprises:
      when the alarm/schedule alert is an anniversary alert, selecting an avatar image corresponding to the anniversary on a specified date in the avatar memory and displaying an anniversary alert message together with the selected avatar image; and
   wherein said display of the alarm/schedule alert message comprises:
      when the alarm/schedule alert is an alarm, selecting an avatar image corresponding to the alarm in the avatar memory, displaying an alarm message together with the selected avatar image and generating a preset alarm sound; and
      when the alarm/schedule alert is a morning call, selecting an avatar image corresponding to the morning call in the avatar memory, displaying a morning call message together with the selected avatar image and generating a preset bell sound;
      when the alarm/schedule alert is a schedule alert, selecting an avatar image corresponding to the schedule alert in the avatar memory, displaying a schedule alert message together with the selected avatar image and generating a preset bell sound; and
      when the alarm/schedule alert is an anniversary alert, selecting an avatar image corresponding to the anniversary alert in the avatar memory, displaying a anniversary alert message together with the selected avatar image and generating a preset bell sound.

2. A method for displaying status information on a mobile terminal, comprising the steps of:
   when an event is generated in the mobile terminal, determining whether a function for displaying a character image has been set for the event;
   if the function has been set, processing the generated event, selecting a character image corresponding to the event in a character memory and displaying an event processing result together with the selected character image; and
   if the function has not been set, processing the generated event and displaying the event processing result;
   wherein said character image is an avatar and said character memory is an avatar memory for storing avatar images corresponding to different events;
   wherein said step of displaying the event processing result comprises:
      when the generated event is an alarm/schedule alert event for which the character displaying function has been set and when a preset alarm/schedule alert time is reached, analyzing a list of alarm/schedule alert registrations; and
      detecting an alarm/schedule alert to be generated at the preset time, selecting an avatar image corresponding to the alarm/schedule alert in the avatar memory and displaying an alarm/schedule alert message together with the selected avatar image;
   wherein said display of the alarm/schedule alert message comprises:
      when the alarm/schedule alert is an anniversary alert, selecting an avatar image corresponding to the anniversary on a specified date in the avatar memory and displaying an anniversary alert message together with the selected avatar image; and
   wherein said step of displaying the event processing result further comprises:
      when the generated event is arrival of a text message, displaying a message informing the arrival of a text message;
      analyzing character strings in the received text message and comparing the analyzed character strings with emotional expressions stored in an emotional expression memory;
      selecting one or more emotional expressions included in the text message; and
      accessing an avatar image corresponding to the selected emotional expressions in the avatar memory that stores multiple avatar images representing various emotions, and displaying the text message together with the corresponding avatar image.

3. The method as claimed in claim 2, wherein said emotional expressions are emoticons.

4. The method as claimed in claim 3, wherein said selection of one or more emotional expressions is a selection of a last emoticon used in the text message.

5. The method as claimed in claim 4, wherein said emotional expressions are classified into five groups representing happiness, sadness, anger, embarrassment and shyness, respectively, and stored in the emotional expression memory so as to store avatar images in a number corresponding to the five different emotions in the avatar memory.

6. The method as claimed in claim 4, wherein said text message is displayed together with an avatar image corresponding to the emotion represented by the selected emotional expressions.

7. The method as claimed in claim 6, wherein said text message is displayed in a word balloon of the avatar image.

8. A method for displaying an event together with a character image on a mobile terminal, comprising the steps of:
  displaying a list of events that can be displayed together with a character image, displaying character images applicable to each selected event, and when a character image is selected, registering the selected character image;
  when an event is generated in the mobile terminal, determining whether a function for displaying a character has been set for the event;
  if the function has been set, processing the generated event, selecting a character image corresponding to the event in a character memory and displaying an event processing result together with the selected character image; and
  if the function has not been set, processing the generated event and displaying the event processing result;
  wherein said events that can be displayed together with a character image include arrival of a text message, alarm or schedule alerts, communication events and popup window events; and
  wherein said step of displaying the event processing result with the selected character image comprises:
    when the generated event is a popup window event for which the character displaying function has been set, selecting a character image to be added to a popup window in the character memory and displaying an information message in the character added popup window;
    when the generated event is an arrival of a text message, analyzing emotional expressions included in the text message, accessing a character image corresponding to the emotional expressions in the character memory and displaying the text message together with the character image;
    when the generated event is an alarm/schedule alert event and a preset alarm/schedule alert time is reached, detecting an alarm/schedule alert registered to be generated at the preset time, selecting a character image corresponding to the alarm/schedule alert and displaying an alarm/schedule alert message together with the selected character image; and
    when the generated event is a communication event, analyzing the communication event, selecting a character image corresponding to the analyzed communication event in the character memory and displaying a message informing the generation of the communication event together with the selected character image.

9. The method as claimed in claim 8, wherein said character image is an avatar and said character memory is an avatar memory for storing avatar images corresponding to different events.

10. A method for displaying status information on a mobile terminal having a character memory for storing character images, which comprises the steps of;
  when the mobile terminal is powered on, accessing a character image corresponding to the power on state in the character memory, displaying power-on state information together with the character image and entering a standby mode;
  when a menu for setting a character displaying function is selected in the standby mode, wherein said character displaying function is for displaying a character image, displaying a list of events to which the character displaying function can be applied, and when one or more events are selected from the list, selecting a character image in the character memory to be displayed for the selected events;
  when an event is generated in the standby mode, analyzing the generated event to determine whether the character displaying function has been set for the event, accessing a character image in the character memory if the character displaying function has been set for the event, and displaying status information relating to the event together with the character image; and
  when the mobile terminal is powered off in the standby mode, accessing a character image corresponding to the power-off state in the character memory, displaying power-off information together with the character and turning off the mobile terminal;
  wherein said character image is an avatar and said character memory is an avatar memory for storing avatar images corresponding to different events;
  wherein said events to which the character displaying function can be applied include arrival of a text message, alarm or schedule alerts, communication events and popup window events; and
  wherein said step of displaying status information comprises:
    when the generated event is a popup window event, selecting an avatar image to be added to a popup window in the avatar memory and displaying an information message in the avatar added popup window;
    when the generated event is an arrival of a text message, analyzing emotional expressions included in the text message, accessing an avatar image corresponding to the emotional expressions in the avatar memory and displaying the text message together with the avatar image;
    when the generated event is an alarm/schedule alert event and a preset alarm/schedule alert time is reached, detecting an alarm/schedule alert registered to be generated at the preset time, selecting an avatar image corresponding to the alarm/schedule alert and displaying an alarm/schedule alert message together with the selected avatar image; and
    when the generated event is a communication event, analyzing the communication event, selecting an avatar image corresponding to the analyzed communication event in the avatar memory and displaying a message informing the generation of the communication event together with the selected avatar image.

11. A method for displaying status information on a mobile terminal, comprising the steps of:

when an event is generated in the mobile terminal, determining whether a function for displaying a character image for visually notifying an occurrence of the event and for specifically indicating to the user at least one of relevant content and general nature of the event has been set for the event;

if the function has been set, processing the generated event, selecting the character image in a character memory and displaying an event processing result together with the character image to visually notify an occurrence of the event and to specifically indicate to the user at least one of relevant content and general nature of the event; and if the function has not been set, processing the generated event and displaying the event processing result;

wherein said character image is an avatar and said character memory is an avatar memory for storing avatar images corresponding to different events;

wherein said step of displaying the event processing result comprises:

when the generated event is an alarm/schedule alert event for which the character displaying function has been set and when a preset alarm/schedule alert time is reached, analyzing a list of alarm/schedule alert registrations; and detecting an alarm/schedule alert to be generated at the preset time, selecting an avatar image corresponding to the alarm/schedule alert in the avatar memory and displaying an alarm/schedule alert message together with the selected avatar image;

wherein said display of the alarm/schedule alert message comprises:

when the alarm/schedule alert is an anniversary alert, selecting an avatar image corresponding to the anniversary on a specified date in the avatar memory and displaying an anniversary alert message together with the selected avatar image.

12. The method as claimed in claim 11, wherein said anniversary is a national or international holiday or a personal anniversary.

13. A method for processing an alarm/schedule alert in a mobile terminal having a character memory for storing character images, which comprises the steps of:

registering, by a user, alarm/schedule alerts by selecting a character image suitable for each alarm/schedule alert in the character memory and setting an alarm time, message and bell sound for each alarm/schedule alert together with the selected character image; and when a preset alarm/schedule time is reached, detecting an alarm/schedule alert registered to be generated at the preset time, accessing a character image preset for the alarm/schedule alert and displaying an alarm/schedule alert message together with the preset character image;

and further comprises:

analyzing the alarm/schedule alert registered to be generated at the preset time;

when the alarm/schedule alert is an alarm, selecting an avatar image corresponding to the alarm in the avatar memory, displaying an alarm message together with the selected avatar image and generating a preset alarm sound; and when the alarm/schedule alert is a morning call, selecting an avatar image corresponding to the morning call in the avatar memory, displaying a morning call message together with the selected avatar image and generating a preset bell sound;

when the alarm/schedule alert is a schedule alert, selecting an avatar image corresponding to the schedule alert in the avatar memory, displaying a schedule alert message together with the selected avatar image and generating a preset bell sound; and when the alarm/schedule alert is an anniversary alert, selecting an avatar image corresponding to the anniversary alert in the avatar memory, displaying a anniversary alert message together with the selected avatar image and generating a preset bell sound.

* * * * *